(12) United States Patent
Reynolds (10) Patent No.: US 8,950,391 B2
(45) Date of Patent: Feb. 10, 2015

(54) DRIVE MECHANISM FOR A SOLAR CONCENTRATOR ASSEMBLY

(75) Inventor: Glenn A. Reynolds, Long Beach, CA (US)

(73) Assignee: Gossamer Space Frames, Huntington Beach, CA (US)

( * ) Notice: Subject to any disclaimer, the term of this patent is extended or adjusted under 35 U.S.C. 154(b) by 732 days.

(21) Appl. No.: 12/722,498

(22) Filed: Mar. 11, 2010

(65) Prior Publication Data

US 2010/0229851 A1 Sep. 16, 2010

Related U.S. Application Data

(60) Provisional application No. 61/209,970, filed on Mar. 11, 2009.

(51) Int. Cl.
  *F24J 2/38* (2014.01)
  *F24J 2/54* (2006.01)
  *F24J 2/14* (2006.01)
  *F24J 2/46* (2006.01)

(52) U.S. Cl.
  CPC .. *F24J 2/541* (2013.01); *F24J 2/14* (2013.01); *F24J 2/4638* (2013.01); *F24J 2002/5441* (2013.01); *F24J 2002/5468* (2013.01); *Y02E 10/45* (2013.01); *Y02E 10/47* (2013.01)
  USPC ............ 126/600; 126/603; 126/604; 126/605

(58) Field of Classification Search
  USPC ......... 126/571, 600–608, 692, 694, 696, 701; 74/490.01
  See application file for complete search history.

(56) References Cited

U.S. PATENT DOCUMENTS

| | | | | |
|---|---|---|---|---|
| 3,247,840 A | * | 4/1966 | Chambers et al. | 126/603 |
| 3,342,358 A | * | 9/1967 | Toppins et al. | 414/420 |
| 4,178,913 A | | 12/1979 | Hutchison | |
| 4,264,145 A | * | 4/1981 | Urruela | 359/846 |
| 4,277,132 A | | 7/1981 | Hansen | |
| 4,285,624 A | * | 8/1981 | Propst et al. | 414/362 |
| 4,546,756 A | * | 10/1985 | Leroy et al. | 126/603 |
| 4,930,493 A | * | 6/1990 | Sallis | 126/600 |
| 5,228,924 A | * | 7/1993 | Barker et al. | 136/246 |
| 5,345,632 A | * | 9/1994 | Langenaeken et al. | 5/601 |
| 5,391,039 A | | 2/1995 | Holtom | |

(Continued)

OTHER PUBLICATIONS

Written Opinion of the International Searching Authority for International Application No. PCT/US2010/027061, filed Mar. 11, 2010, Written Opinion dated Apr. 25, 2010 and mailed May 11, 2010 (5 pgs.).

(Continued)

*Primary Examiner* — Jorge Pereiro (57) ABSTRACT

A drive mechanism for a solar concentrator assembly. In one embodiment, a drive mechanism for a linear solar concentrator assembly which includes an elongate reflector support frame which is rotatable about an axis which is parallel to the length of the frame and is defined by a support for the frame includes: a first elongate arm fixable at one end to the frame for rotation about the axis with the frame; a second elongate arm rotatable at one end about the axis independently of the first arm; a first reversible linear drive device coupled between the second arm and the first arm which is operable to rotate the first arm about the axis relative to the second arm; and a second reversible linear drive device coupled between the support and the second arm which is operable to rotate the second arm about the axis.

19 Claims, 12 Drawing Sheets

(56) References Cited

U.S. PATENT DOCUMENTS

| | | | | |
|---|---|---|---|---|
| 5,469,182 A * | 11/1995 | Chaffee | ........................ | 343/882 |
| 5,512,742 A * | 4/1996 | Mattson | ..................... | 250/203.4 |
| 6,241,455 B1 * | 6/2001 | Schupback et al. | ........... | 414/723 |
| 6,336,452 B1 * | 1/2002 | Tirey, Jr. | ....................... | 126/690 |
| 6,915,600 B2 * | 7/2005 | Kondou | ......................... | 37/414 |
| 6,971,195 B2 * | 12/2005 | Kondou | ......................... | 37/414 |
| 7,357,132 B2 | 4/2008 | Hayden | | |
| 7,419,350 B2 * | 9/2008 | Lombardo et al. | ............ | 414/685 |
| 7,760,153 B2 * | 7/2010 | Bulow | ........................... | 343/765 |
| 2005/0188518 A1 * | 9/2005 | Lombardo et al. | ........... | 29/401.1 |
| 2007/0039610 A1 * | 2/2007 | Head et al. | ................... | 126/605 |
| 2007/0105070 A1 * | 5/2007 | Trawick | ......................... | 434/11 |
| 2008/0078379 A1 * | 4/2008 | Kimura et al. | ................ | 126/648 |
| 2008/0078380 A1 * | 4/2008 | Kimura et al. | ................ | 126/696 |
| 2008/0083405 A1 * | 4/2008 | Kimura et al. | ................ | 126/690 |
| 2008/0092878 A1 * | 4/2008 | Kimura et al. | ................ | 126/696 |
| 2008/0127967 A1 * | 6/2008 | Kimura et al. | ................ | 126/694 |
| 2008/0282828 A1 * | 11/2008 | Jones | .......................... | 74/471 R |
| 2009/0309800 A1 * | 12/2009 | Bulow | ........................... | 343/757 |
| 2009/0314283 A1 * | 12/2009 | Kimura et al. | ................ | 126/696 |
| 2010/0051017 A1 * | 3/2010 | Xie et al. | ....................... | 126/600 |
| 2010/0139645 A1 * | 6/2010 | Whipple et al. | .............. | 126/576 |
| 2010/0192942 A1 * | 8/2010 | Jones | .......................... | 126/602 |
| 2010/0236600 A1 * | 9/2010 | Kimura et al. | ................ | 136/246 |
| 2010/0252030 A1 * | 10/2010 | Marcotte et al. | ............. | 126/694 |
| 2011/0043433 A1 * | 2/2011 | Klien | ............................ | 343/882 |
| 2011/0073102 A1 * | 3/2011 | Hanson et al. | ................ | 126/601 |
| 2011/0079214 A1 * | 4/2011 | Hon | ............................... | 126/573 |

OTHER PUBLICATIONS

International Search Report for International Application No. PCT/US2010/027061, filed Mar. 11, 2010, International Search Report dated Apr. 25, 2010 and mailed May 11, 2010 (2 pgs.).

International Preliminary Report on Patentability for International Application PCT/US10/27061, filed Mar. 11, 2010 (8 pgs.).

* cited by examiner

DRIVE MECHANISM FOR A SOLAR CONCENTRATOR ASSEMBLY

CROSS-REFERENCE TO RELATED APPLICATION

This application claims priority to and the benefit of U.S. Provisional Patent Application No. 61/209,970, filed on Mar. 11, 2009 in the United States Patent and Trademark Office, the entire content of which is incorporated herein by reference.

FIELD

The present invention relates generally to solar collection facilities, and more particularly to a drive mechanism for a solar concentrator assembly.

BACKGROUND

Solar collection facilities utilize solar concentrators and/or photovoltaic panels for harnessing solar energy. Solar concentrator assemblies (SCAs) utilizing movable parabolic trough collectors present large reflective surface areas (apertures) for tracking the sun and focusing the captured radiant energy on linear heat collection elements (HCEs) as a first step in a thermomechanical conversion process for generating electrical power. A solar-trough solar power generation facility typically includes many SCAs arranged in rows to capture great amounts of solar radiant energy.

A typical arrangement for an SCA is to have a row of solar trough assemblies track the sun utilizing a single-axis drive mechanism located at a central region of the SCA with a group of trough assemblies, such as six trough assemblies, connected in coaxial serial alignment on either side of the drive mechanism, or center drive unit. Typically, a drive mechanism for an SCA has been one of an electric drive motor, a drum and cable device, a rack or worm gear drive, or a hydraulic device consisting of two hydraulic cylinders configured in parallel to one another, such as in a V-shape with a common pivot point at the bottom, and one of the cylinders primarily used for pushing, and the other cylinder primarily used for pulling. Problems with such currently used drive devices, however, include inconsistent forces, poor reliability and durability, high cost, very high hydraulic fluid pressures, high tracking errors due to a short moment arm, and loss of solar collection due to large device widths creating shadowed regions on the HCE.

SUMMARY

Aspects of embodiments of the present invention are directed to a drive mechanism for a solar concentrator assembly. The drive mechanism preferably can include a first fluid-powered ram, or cylinder, and a second fluid-powered ram, or cylinder, configured to rotate at least one trough assembly of the solar concentrator assembly about an axis of rotation for adjusting an orientation of the at least one trough assembly. Embodiments of a drive mechanism for a solar concentrator assembly according to the present invention have a shallow profile and narrow width, and are thereby configured to cast a minimal shadow on the solar collecting surfaces and/or a heat collection element for improved thermodynamic efficiency, as well as to reduce a gap between solar collecting surfaces and a cold spot on a heat collection element. Further, embodiments of a drive mechanism for a solar concentrator assembly according to the present invention include first and second hydraulic cylinders that are configured to both push in sequence or together, or both pull in sequence or together. That is, embodiments of a drive mechanism for a solar concentrator assembly according to the present invention include first and second hydraulic cylinders that are configured to work in series for pushing or pulling at least one trough assembly about an axis of rotation for increased efficiency of the hydraulic cylinders, rather than a first hydraulic cylinder pushing and a second hydraulic cylinder pulling concurrently in parallel.

According to one embodiment of the present invention, a drive mechanism for a linear solar concentrator assembly which includes an elongate reflector support frame which is rotatable about an axis which is parallel to the length of the frame and is defined by a support for the frame includes: a first elongate arm fixable at one end to the frame for rotation about the axis with the frame; a second elongate arm rotatable at one end about the axis independently of the first arm; a first reversible linear drive device coupled between the second arm and the first arm which is operable to rotate the first arm about the axis relative to the second arm; and a second reversible linear drive device coupled between the support and the second arm which is operable to rotate the second arm about the axis.

In one embodiment, the first and second linear drive devices include first and second double-acting, fluid-powered rams. The first and second rams may be hydraulically powered. The first and second rams may be located substantially in a common plane normal to the axis. The first and second linear drive devices may include electrically powered linear motion devices.

In one embodiment, the first and second linear drive devices are arranged such that both the first and second linear drive devices are operable in an extend mode when the frame is rotated in a first direction about the axis and both the first and second linear drive devices are operable in a retract mode when the frame is rotated in a second direction about the axis opposite the first direction.

In one embodiment, the drive mechanism is substantially symmetrical about a plane normal to the axis. The drive mechanism may be operable to rotate the frame about the axis through an angular range of at least 240 degrees.

According to another embodiment of the present invention, in a linear solar concentrator assembly which includes an elongate reflector support frame which is rotatable about an axis which is parallel to the length of the frame and is defined by a support for the frame, a reversible drive mechanism operable for rotating the frame about the axis includes: an elongate idler arm rotatable at one end about the axis independently of the frame; a first reversible linear drive device effectively coupled between the idler arm and the frame at a location spaced from the axis which is operable to rotate the frame about the axis relative to the idler arm; and a second reversible linear drive device coupled between the support and the idler arm which is operable to rotate the idler arm about the axis.

According to another embodiment of the present invention, a method of driving rotation of an elongate reflector support frame of a linear concentrator assembly about an axis utilizing a drive mechanism including first and second linear drive devices and an elongate idler arm includes rotating the frame about the axis relative to the idler arm using the first linear drive device, and rotating the frame about the axis using the second linear drive device. In one embodiment, rotating the frame about the axis using the second linear drive device includes rotating the idler arm about the axis. In one embodiment, a method further includes rotating the frame about the axis at least 90 degrees using the first linear drive device, and subsequently rotating the frame about the axis at least 90 degrees using the second linear drive device.

According to another embodiment of the present invention, a drive mechanism for a solar concentrator assembly includes a first hydraulic ram and a second hydraulic ram configured to rotate at least one trough assembly of the solar concentrator assembly in either direction about an axis of rotation through a desired range of motion of the trough assembly. The first and second hydraulic rams are coupled in series and are operable, preferably in sequence, to rotate the trough assembly in the desired direction of rotation. In one embodiment, the first and second hydraulic rams are positioned to apply forces in substantially a same plane as one another.

In one embodiment, the drive mechanism includes a drive arm for transferring a force provided by the first hydraulic ram to at least one trough assembly, the drive arm having a first end coupled to the first hydraulic ram and a second end coupled to a torque plate which is secured to the trough assembly. In one embodiment, the drive mechanism includes a pivot arm for transferring a force provided by the second hydraulic ram, the pivot arm having a first end carrying the first hydraulic ram, a second end rotatable about the axis of rotation of the concentrator assembly, and an angled portion between the first and second pivot arm ends and coupled to the second hydraulic ram which acts to move the pivot about the axis of rotation of the concentrator assembly.

According to another embodiment of the present invention, a solar concentrator assembly includes at least one trough assembly for collecting radiant solar energy and a drive mechanism for rotating the at least one trough assembly about an axis, the drive mechanism including a first hydraulic ram and a second hydraulic ram connected in series and preferably operated in sequence to turn the at least one trough assembly about the axis.

Other features and advantages of the present invention will become apparent from the following detailed description, taken in conjunction with the accompanying drawings which illustrate, by way of example, the features of the present invention.

DETAILED DESCRIPTION

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive or exhaustive.

Figure 1:
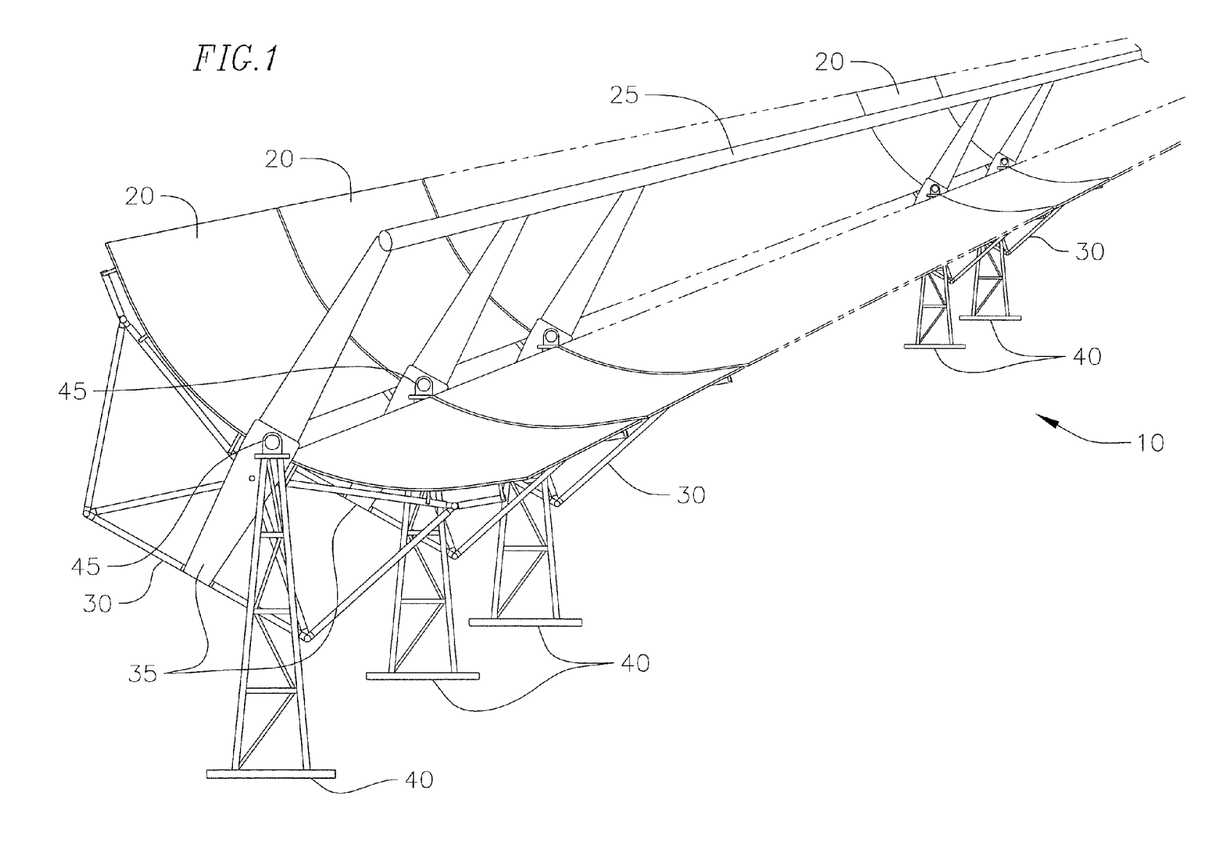
FIG. 1 is a perspective view of a portion of a solar concentrator assembly.
Figure 3:
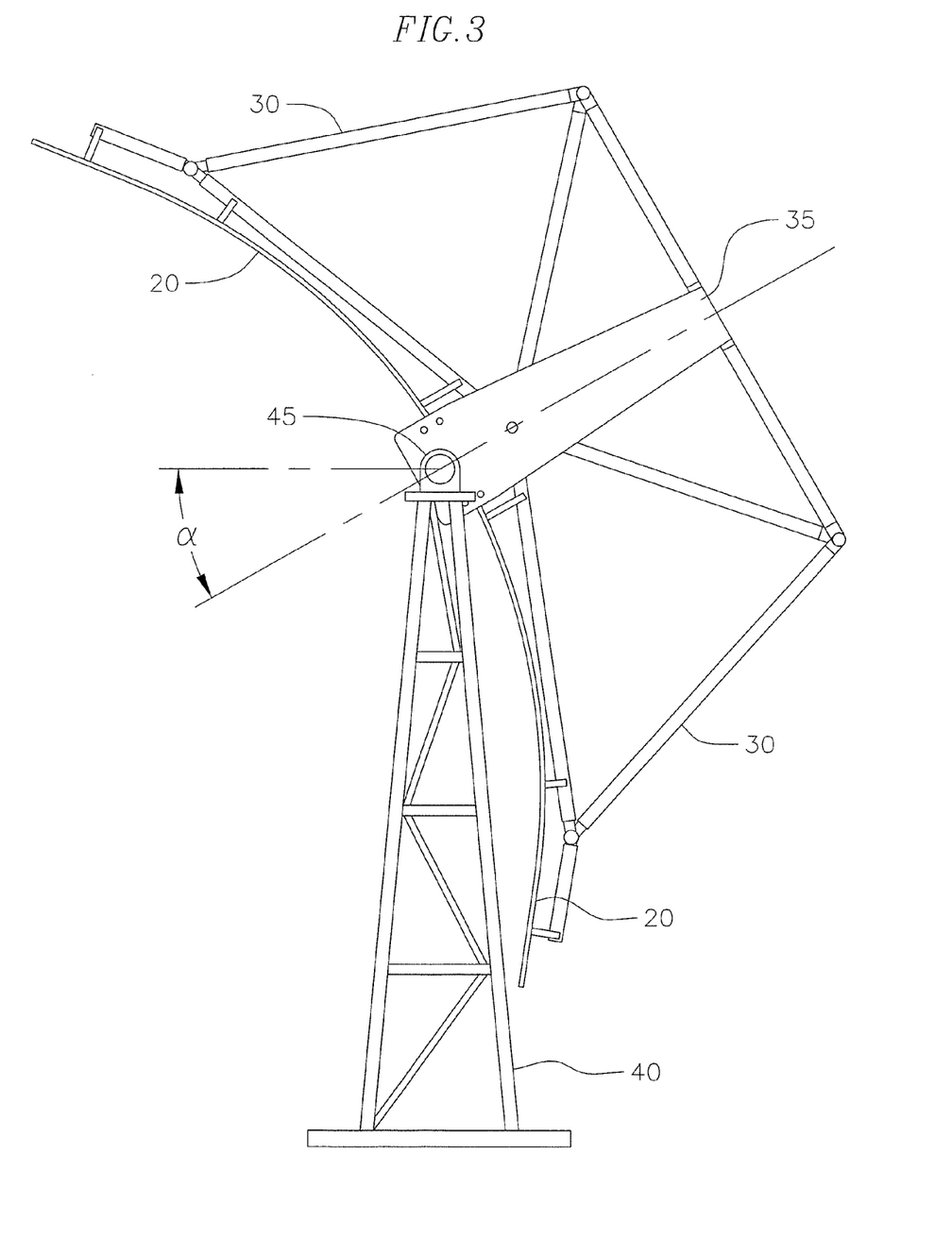
FIG. 3 is a side view of a trough assembly of a solar concentrator assembly.

With reference to FIG. 1, a solar concentrator assembly ("SCA") 10 includes a row of parabolic, cylindrically curved, or otherwise curved, troughs 20 for collecting radiant solar energy. The troughs 20 have reflective surfaces for reflecting and focusing the radiant energy on a heat collection tube 25. Each of the troughs 20 is supported by a corresponding trough frame 30, which may be constructed of tubes, bars, extrusions, and/or any other suitable structural members for supporting and maintaining the critical shape of each of the troughs 20 and the reflective surfaces thereon. Each of the trough frames 30 may include two torque plates 35, one at each end of the frame, for coupling to and supporting the trough frames 30 on supporting pylons 40 via stub axles which extend between adjacent frames in the SCA. All stub axles are coaxially aligned. Each torque plate is keyed or otherwise angularly secured to the pertinent stub axle. The torque plates 35, may, for example, be movably coupled to the supporting pylons 40 at bearings 45. The troughs 20 shown in FIG. 1 are oriented in an upward-facing direction for collecting radiant solar energy. The orientation of the troughs 20 may be varied utilizing a drive mechanism to track the movement of the sun throughout the day or throughout the seasons. That is, an angle of the troughs 20 with respect to the horizon may be changed for efficiency of solar energy collection by rotating the troughs 20 about an axis, namely, the common axis of the several stub axles. Further, as shown in FIG. 3 and represented by the angle α, the troughs 20 may be oriented in a downward-facing direction for protection of the troughs 20 against high winds or for maintenance.

Figure 2:
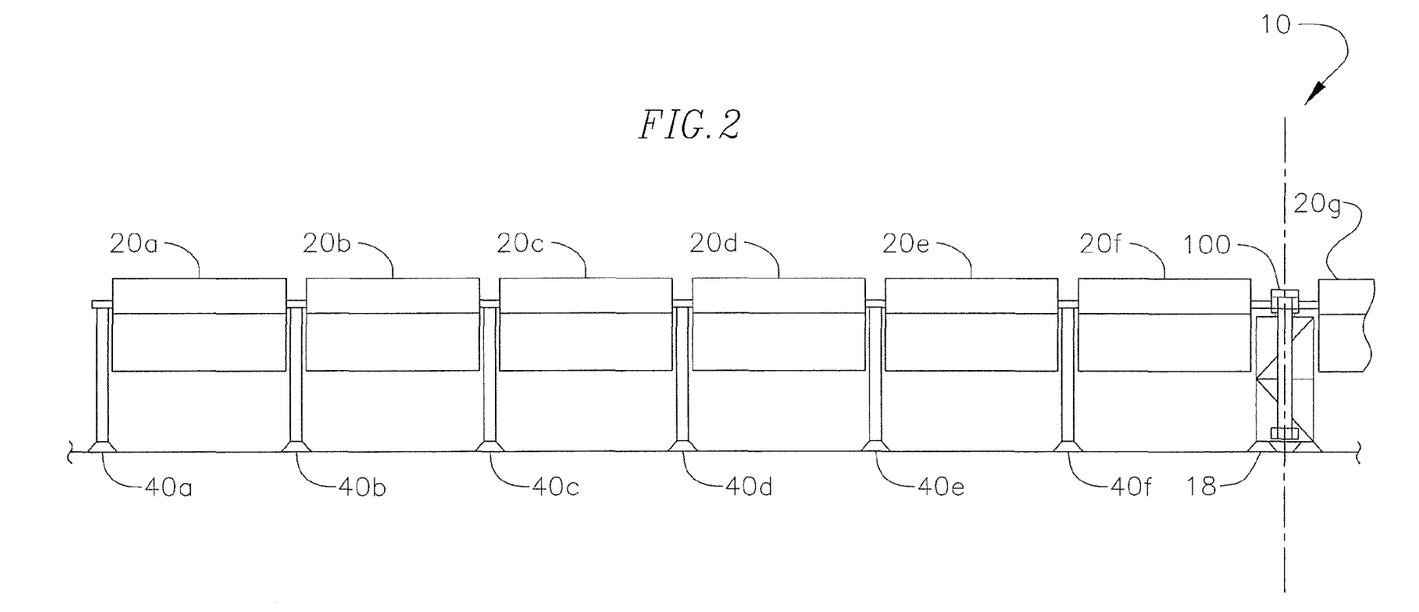
FIG. 2 is a schematic front view of one-half of a solar concentrator assembly and of a drive mechanism for driving rotation of trough assemblies of the entire solar concentrator assembly.

With reference to FIG. 2, the SCA 10 includes a drive mechanism 100 according to an embodiment of the present invention. The SCA 10 is shown having six troughs 20a, 20b, 20c, 20d, 20e, 20f connected to one another in a row on one side of the drive mechanism 100 and supported by pylons 40a, 40b, 40c, 40d, 40e, 40f, respectively, as illustrated. The trough 20f adjacent the drive mechanism is connected to and driven by the drive mechanism 100. Because each of the six troughs along the row are connected to one another via their end torque plates and related stub axles, the troughs 20a, 20b, 20c, 20d, 20e are indirectly driven by the drive mechanism 100. Similarly, a trough 20g is connected to the drive mechanism 100 at the opposite side, and may be connected in a row to five additional troughs (not shown). Of course, an SCA may include any other suitable number of troughs. The drive mechanism 100 and the stub axle which interconnects the two troughs 20f, 20g adjacent the drive mechanism 100 on either side are supported by a central pylon 18. The drive mechanism 100 drives a rotational movement of all of the troughs 20 of the SCA 10 in unison, and may further provide braking for the SCA in its stowed position. During daylight hours the SCA 10 is operated as long as the wind speed does not exceed a certain threshold, and may be rotated about its preferably horizontal axis of rotation via the drive mechanism 100. Once a maximum operational wind speed is reached, the troughs 20 may be rotated via the drive mechanism 100 to a stowed position for protection, such as the position shown in FIG. 3.

Figure 9:
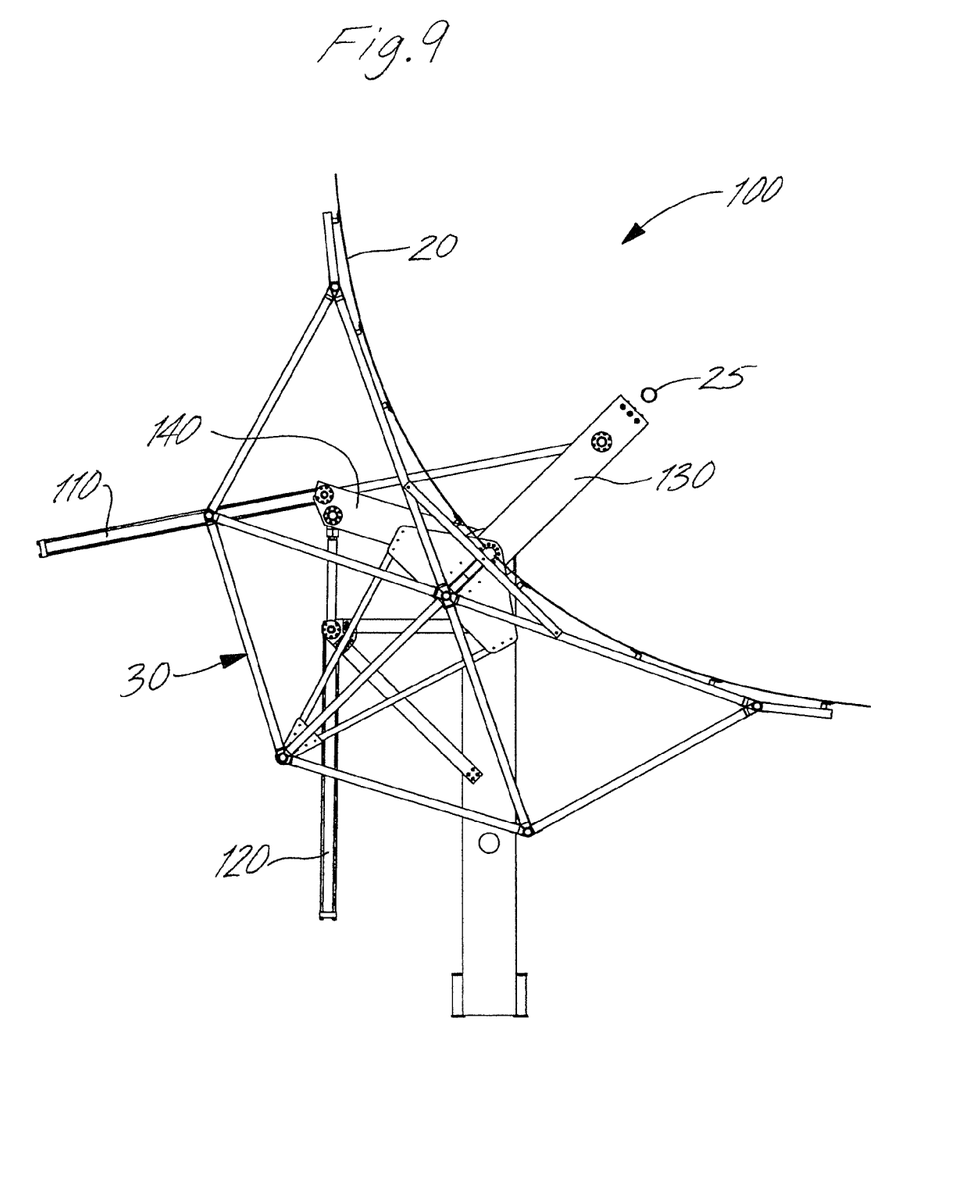
FIG. 9 is a side view of the drive mechanism for a solar concentrator assembly of FIG. 4, the solar concentrator assembly being shown in a fourth collecting position.
Figure 10:
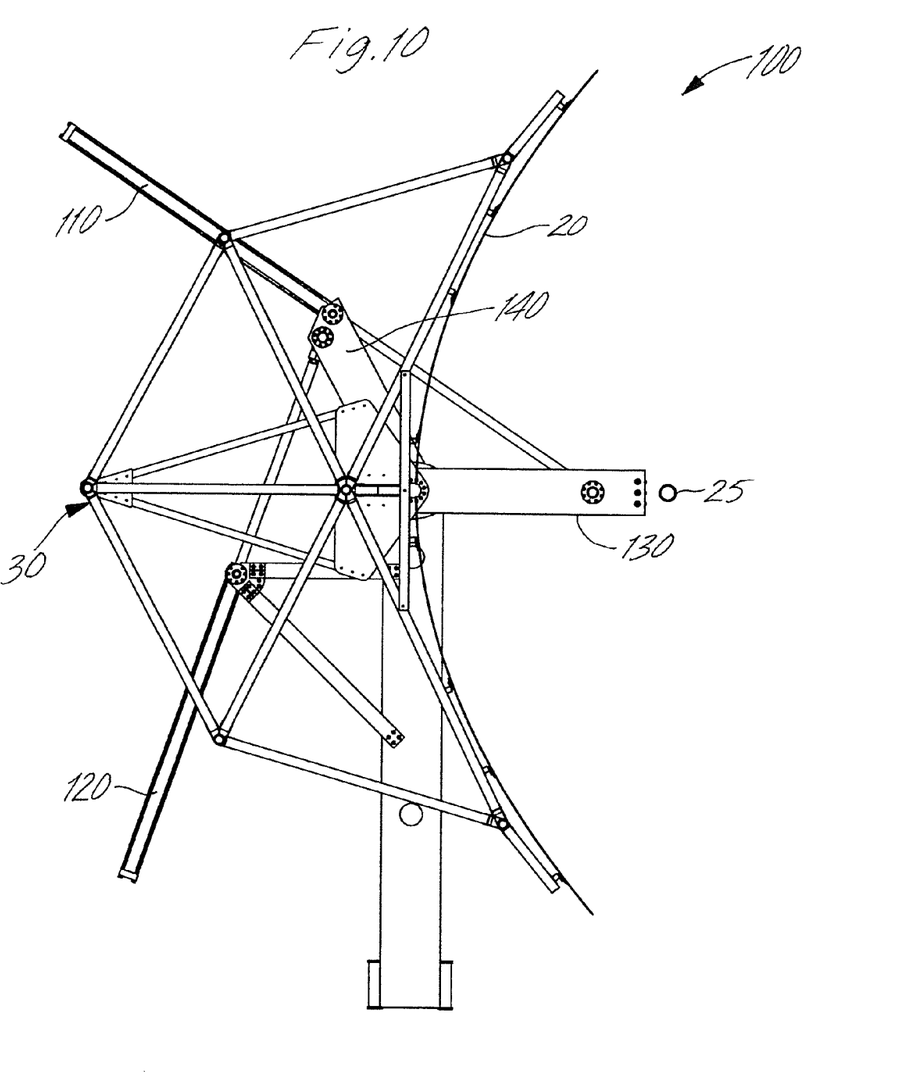
FIG. 10 is a side view of the drive mechanism for a solar concentrator assembly of FIG. 4, the solar concentrator assembly being shown in a fifth collecting position.
Figure 11:
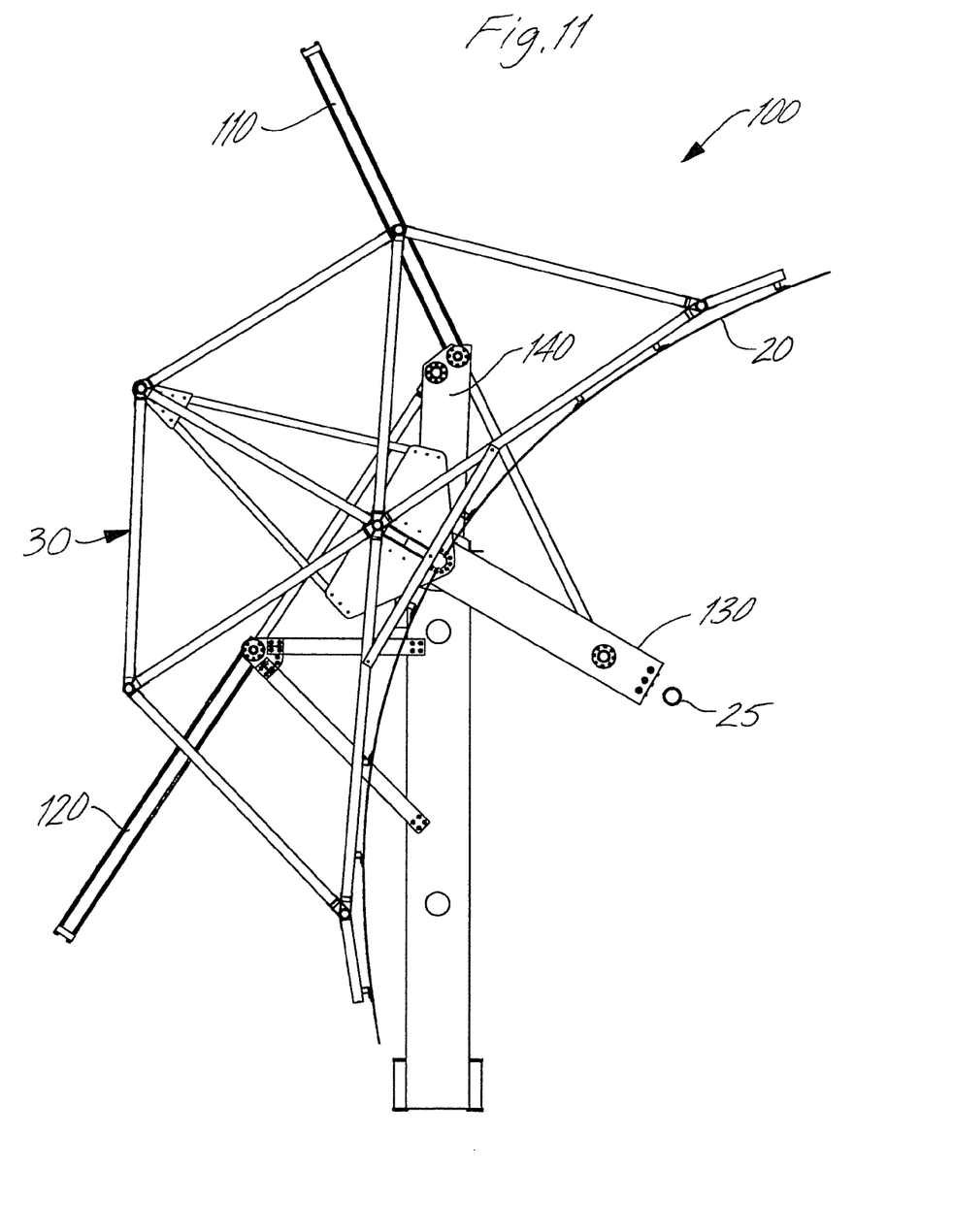
FIG. 11 is a side view of the drive mechanism for a solar concentrator assembly of FIG. 4, the solar concentrator assembly being shown in a stowed position.
Figure 12:
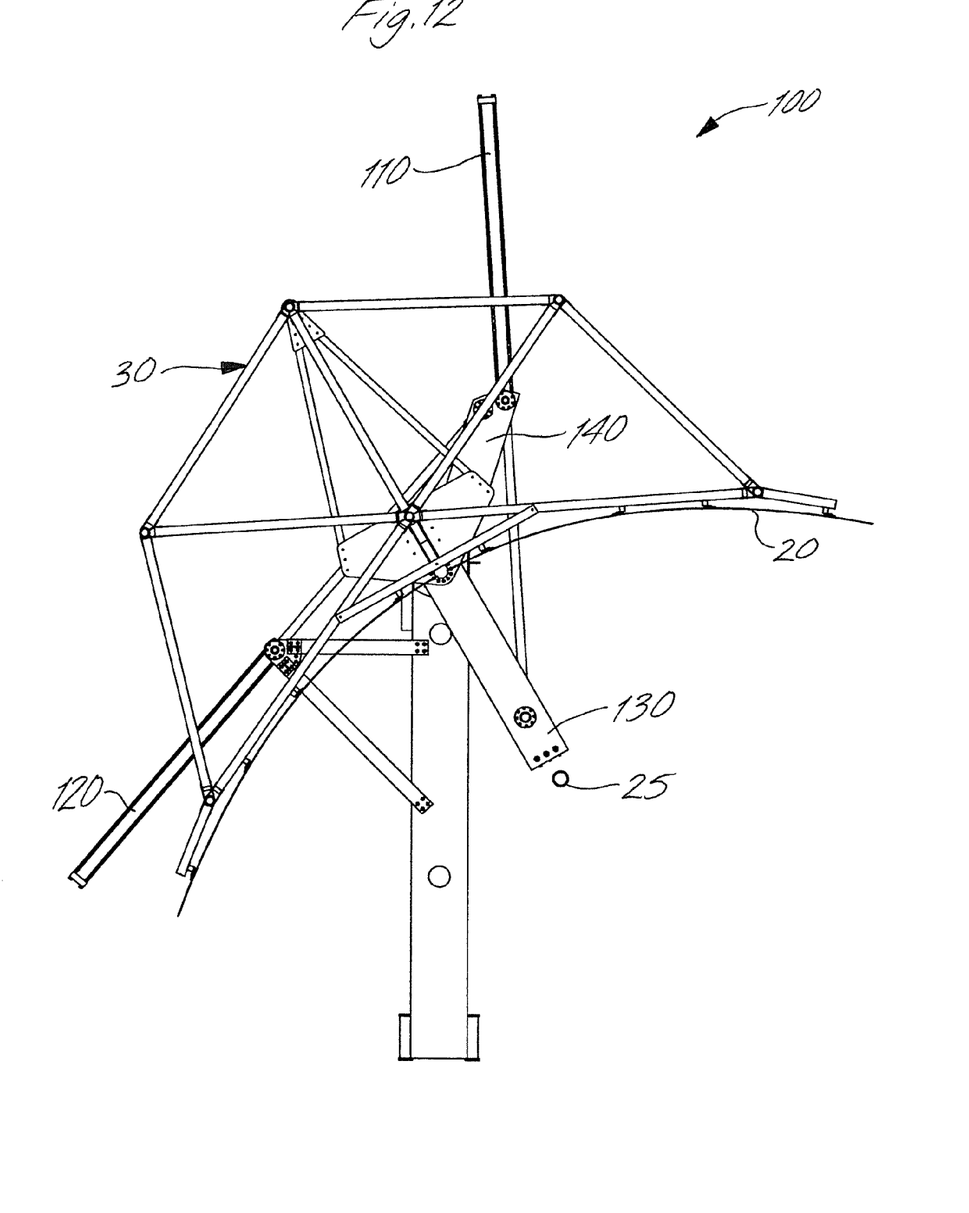
FIG. 12 is a side view of the drive mechanism for a solar concentrator assembly of FIG. 4, the solar concentrator assembly being shown in a maintenance position.

A drive mechanism 100 according to an embodiment of the present invention is shown in various positions in FIGS. 4-12, the various positions of the drive mechanism 100 providing the trough 20 with various orientations within a range of motion of the trough. That range of motion includes a solar-tracking operational range (substantially between an east horizon-facing position and a west horizon-facing position) and a stowed position and a maintenance position; the maintenance position can be at one end of that range of motion and one of the horizon-facing positions can be at the other end of that range. With reference to FIGS. 4-10, for example, the drive mechanism 100 is shown having various radiant solar energy collecting positions wherein a midplane of the trough 20 is substantially parallel to the horizon, or the trough 20 is in an upward-facing orientation. In contrast, FIG. 11 shows the drive mechanism 100 in a position for providing the trough 20 with a downward facing orientation, or a secured (locked) stowed position, for safety during high wind conditions. Similarly, FIG. 12 shows the drive mechanism 100 in a position for providing the trough 20 with another downward facing orientation for maintenance or repairs of the trough 20.

Figure 4:
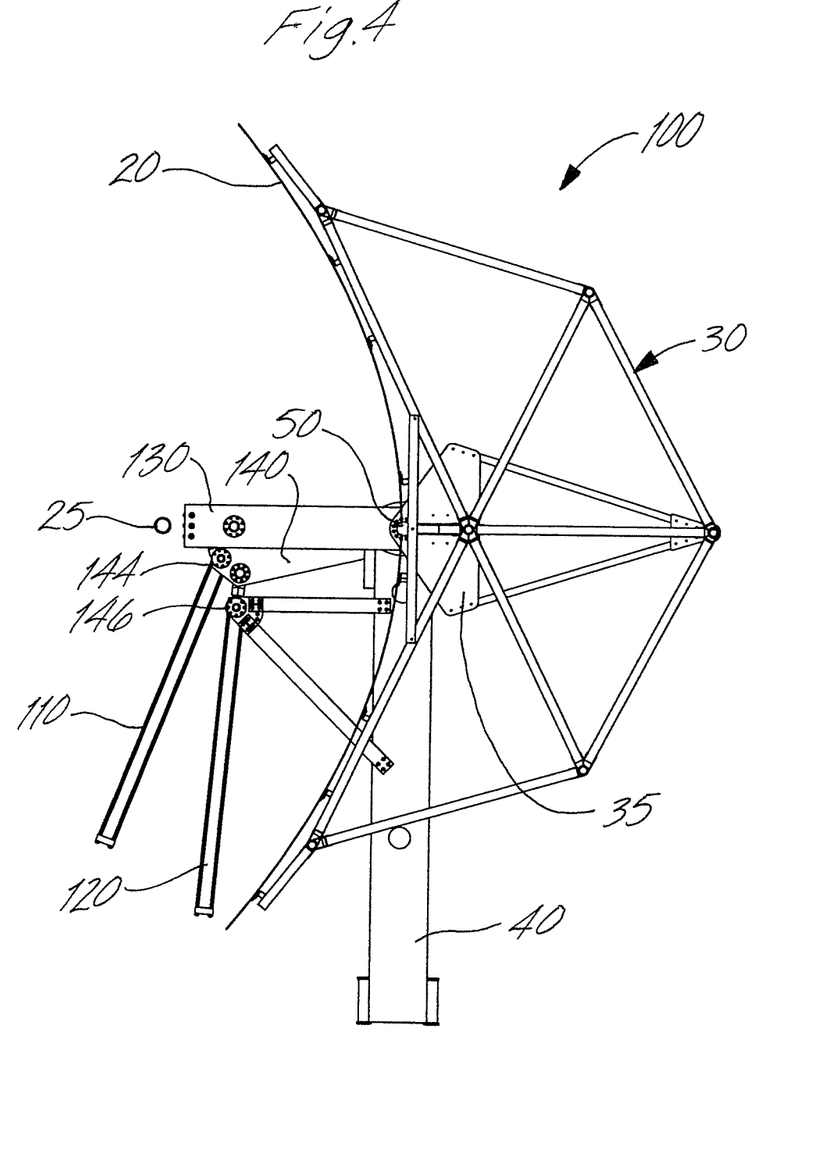
FIG. 4 is a side view of a drive mechanism for a solar concentrator assembly according to an embodiment of the present invention, the solar concentrator assembly being shown in a first collecting position.

With reference to FIG. 4, according to one embodiment, the drive mechanism 100 includes a first double-acting, fluid-powered (e.g., hydraulic or pneumatic) ram 110 and a second double-acting, fluid-powered (e.g., hydraulic or pneumatic) ram 120. In alternative embodiments, ball screws, rack and pinion mechanisms, DC drives, or any other suitable linearly acting devices may be utilized instead of fluid-powered rams. The first ram 110, as depicted in FIG. 4, is positioned outside and above the second ram 120. Further, in one embodiment, the first and second rams 110, 120 are positioned to apply forces in substantially a same plane as one another. That is, the first and second rams 110, 120 are located in a common plane (see, e.g., FIG. 6). This configuration provides the drive mechanism 100 with a narrow width and, as such, minimizes a shadow cast on the solar energy collecting surfaces and elements. Further, by connecting and actuating the first and second rams 110, 120 in a series configuration, that is actuating each of the first and second rams 110, 120 individually and sequentially and in a pushing (or pulling) mode, rather than in a parallel configuration in which one ram pushes while the other pulls, forces produced by the first and second rams 110, 120 may be more efficiently applied to the troughs 20 and, as such, smaller, less costly rams (e.g., 4.5-inch hydraulic rams) may be selected for the first and second rams 110, 120. Of course, while the first and second rams 110, 120 are described above as being operable by actuating individually and sequentially, the first and second rams 110, 120 of the drive mechanism 100 according to embodiments of the present invention may be actuated together with a total applied force being divided between the first and second rams 110, 120 in any desired ratio.

A hydraulic ram is a device which operates linearly. Such a ram has an outer cylinder in which a piston is moved in a selected direction along the cylinder in response to the application of hydraulic pressure to one side or the other of the piston. The piston is connected to one end of a connecting rod which extends along the axis of the cylinder to the exterior of the cylinder through seals at one end of the cylinder. The end of the connecting rod opposite from the piston can be connected, as via a pinned connection, to one of two elements which are to be moved relative to each other. The cylinder of the ram is connected, as by a pinned connection, to the other of the two relatively movable elements. The connection of the cylinder to its relatively movable element can be either one of two types of connection (mounting). If the cylinder is pinned, e.g., adjacent its rod end (the end of the cylinder from which the connecting rod extends) to some other structure, that is a trunnion mounting of the cylinder. If the end of the cylinder remote from the connecting rod is pinned, e.g., to some other structure, that is a standard end mounting of the cylinder. A double-acting ram is one in which hydraulic pressure can be applied to either side of the pistons to forcibly operate the ram in both push and pull modes.

Figure 5:
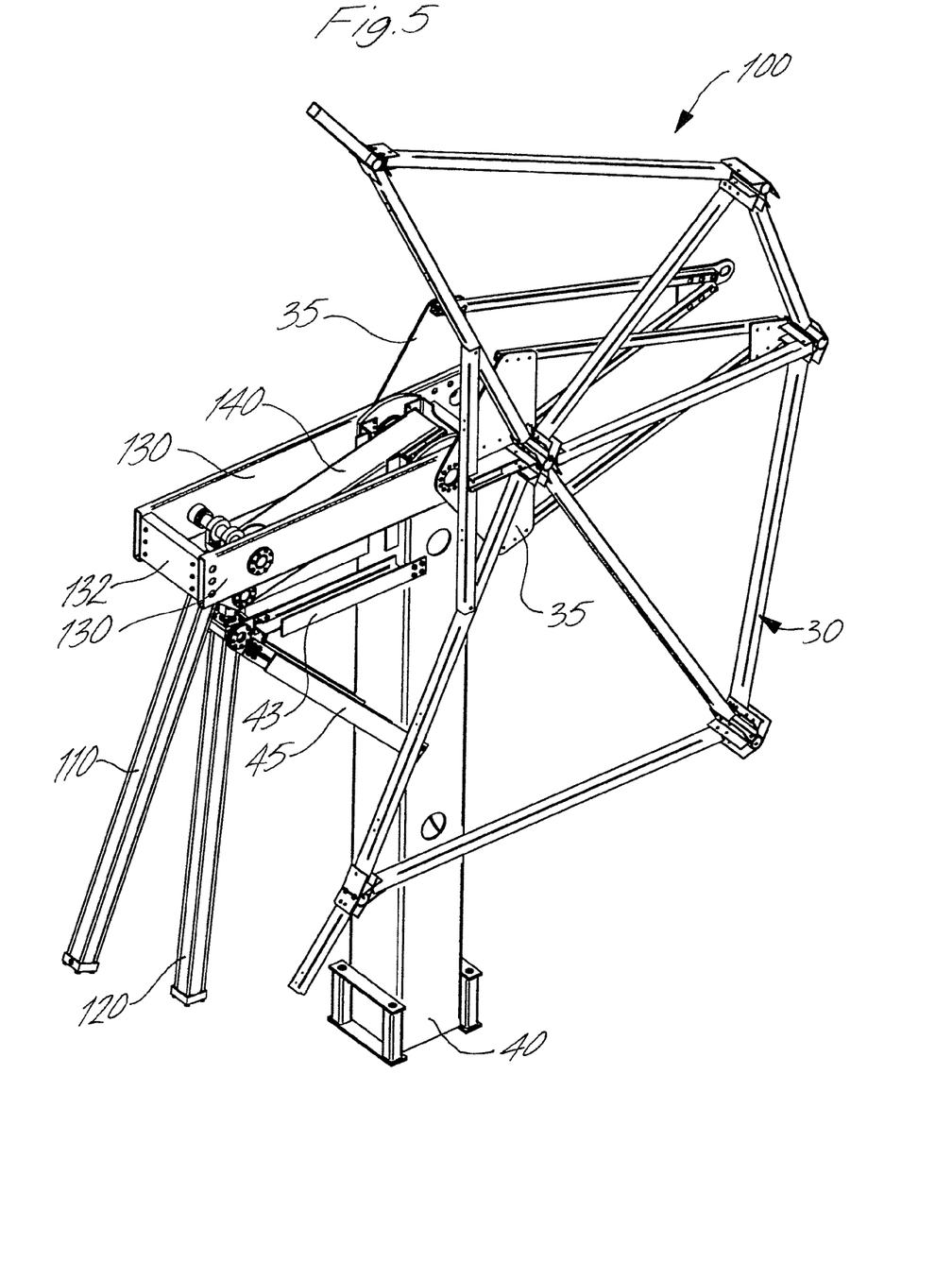
FIG. 5 is a perspective view of the drive mechanism for a solar concentrator assembly of FIG. 4, the solar concentrator assembly being shown in the first collecting position.
Figure 6:
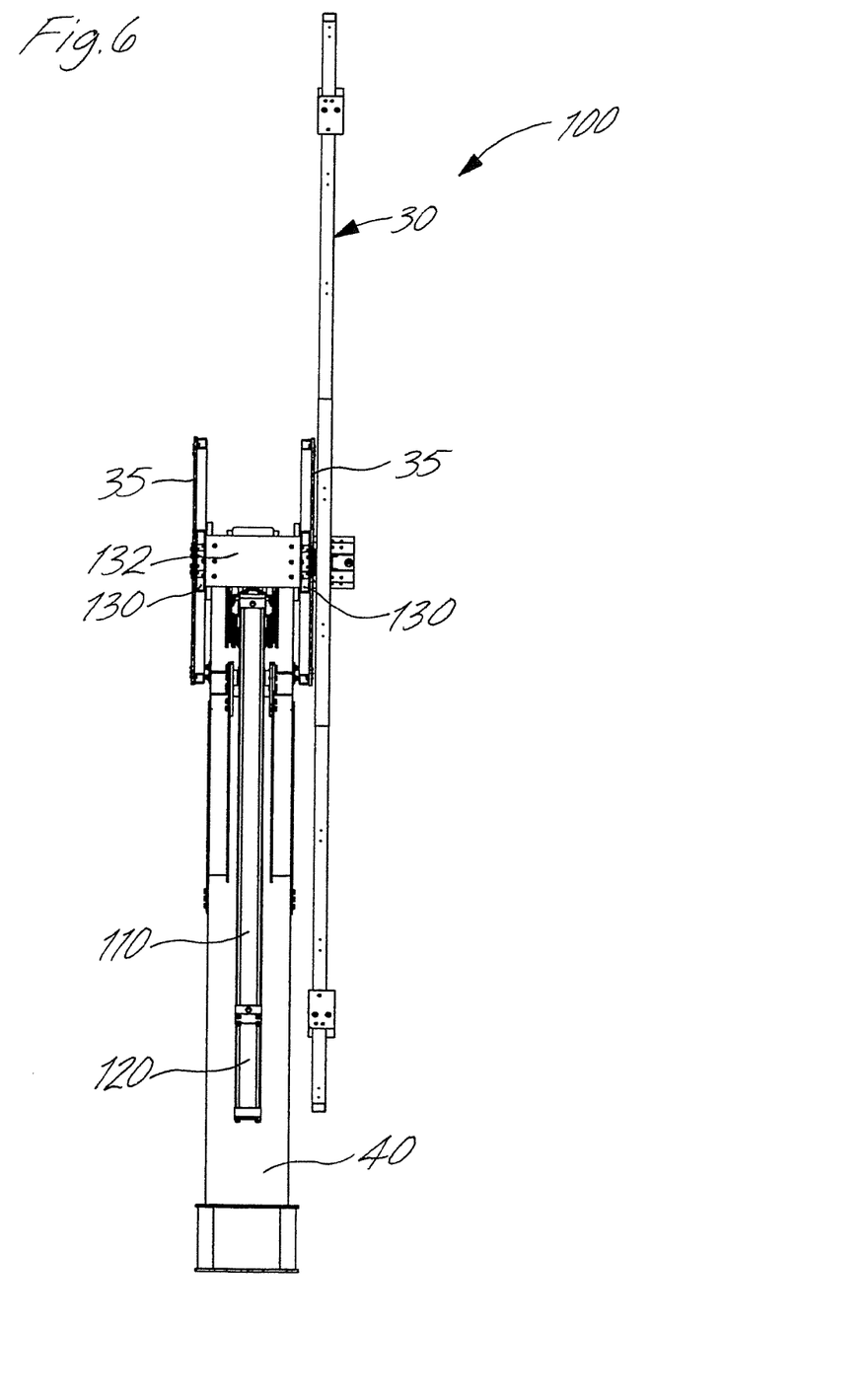
FIG. 6 is a front view of the drive mechanism for a solar concentrator assembly of FIG. 4, the solar concentrator assembly being shown in the first collecting position.

With further reference to FIGS. 4-6, the drive mechanism 100, according to one embodiment, includes a drive arm 130 (or first arm) for transferring the force provided by the first ram 110 to the troughs 20 via the trough torque plates 35 (to which the drive arm 130 is affixed) to rotate the troughs 20 by a first amount, and a pivot arm 140 for applying the force provided by the second ram 120 to rotate the troughs 20 by a second amount. Further, in one embodiment, the drive mechanism 100 includes two drive arms 130, one on either side of the first and second rams 110, 120, and two pivot arms 140, similarly one on either side of the first and second rams 110, 120. The drive arms 130 are affixed to respective ones of the torque plates 35 at the opposing ends of two adjacent trough frames of the SCA, i.e., the frames on either side of the central drive mechanism for the SCA. Further, in one embodiment, the two drive arms 130 are fixed to each other at first ends via a connecting plate 132. While FIGS. 5 and 6, for reasons of clarity, depict only one trough on one side of the drive mechanism 100, it is noted that a second trough may be connected to the torque plate 35 on the opposite side of the drive mechanism 100 from the one trough shown. Also, for reasons of clarity, only a portion of a trough frame of the one trough is shown in FIGS. 5 and 6, rather than the entire trough frame.

In one embodiment, each drive arm 130 has a first end (e.g., an outer end) pivotably coupled to the connecting rod of the first ram 110 and a second end opposite the first end that is secured to, such as fixedly connected or integral to, the trough 20, such as via the torque plate 35 of the trough adjacent trough frame. For example, in one embodiment, such as in a new installation, the drive arms 130 may be integral with the respective torque plates 35. In another embodiment, such as for retrofitting an existing SCA, the drive arms 130 may be fixedly connected to the respective torque plates 35, such as by welding, fasteners, or any other suitable device or method. As such, the drive arm 130 is configured to directly transfer a force generated by the first ram 110 to the torque plates 35 of the trough frames 30 for rotating the troughs 20. The length of the drive arm 130 may be selected for maximizing cost and efficiency of the first ram 110, as well as achieving a desired tracking controllability, such as by increasing or decreasing the length of a moment arm between the first end of the drive arm 130 where the force of the first ram 110 is applied and an axis of rotation about which the troughs 20 are rotated. Additionally, in one embodiment, the second end of the drive arm 130 may be fixedly coupled to a pylon shaft 50 such that the pylon shaft 50, the drive arm 130, and the trough 20 including the torque plate 35 are configured to rotate together about the axis of rotation, and in relation to the pylon 40. The pylon shaft 50 is the same as, or functionally equivalent to, a stub axle to which are keyed or splined, e.g., the opposing torque plates 35 of the trough frames on opposite sides of the drive mechanism 100.

The pivot arm 140 (or second arm, idler arm, or intermediate arm), according to one embodiment, has a first end (e.g., an outer end) and a second end. Further, in one embodiment, the cylinder of the first ram 110 is pivotably coupled between the first ends of two pivot arms 140 (e.g., one on each side of the first ram 110) via a trunnion mount at a pivot 144, or alternatively, via any other suitable mounting configuration. The second ram 120 is pivotably connected via its connecting rod near the first ends of the pivot arms 140 and also is rotatably mounted to the pylon 40 at a pivot 146 with upper and lower supports 43 and 45 in a trunnion mount of the second ram 120 to the pylon 40, or alternatively, by a standard mount to a lower location on the pylon 40 or any other suitable device or method. Additionally, in one embodiment, the second ends of the pivot arms 140 are coupled to and rotatable about the pylon shaft 50 of the pylon 40. The pivot arm 140, in one embodiment, is rotatable about the axis of rotation separately from the trough 20 and the motion of the pivot arm 140 moves the trough 20 via the connection of the second ram 120, and is arranged intermediate the pylon 40 and the trough 20 in the organization of the system. In one embodiment, a configuration of the pivot arm 140 provides an offset pivot for the trunnion-mounted ram. If desired, the offset amount can be greater than shown to position the first ram 110 on the opposite side of the pylon shaft 50 from the second ram 120 to afford greater rotational motion of the SCA. Further, in an alternative embodiment, the pivot arm may have a dogleg shape for providing an offset pivot. A pivot arm having a dogleg shape, for example, is described in U.S. Provisional Patent Application No. 61/209,970, the entire content of which is incorporated herein by reference.

With reference to FIGS. 4-6, the drive mechanism 100 is shown in a first position for maintaining the trough 20 in a first solar energy collecting position. In the first position, as shown, the first and second rams 110, 120 are not extended. Also, as shown, in the first solar energy collecting position, a midplane of the trough 20 is substantially parallel to the horizon, so that the trough has a horizon-facing position. Alternatively, a first position of the drive mechanism 100 in which the first and second rams 110, 120 are not extended may correspond to any other desired solar energy collecting position of the troughs 20.

Figure 7:
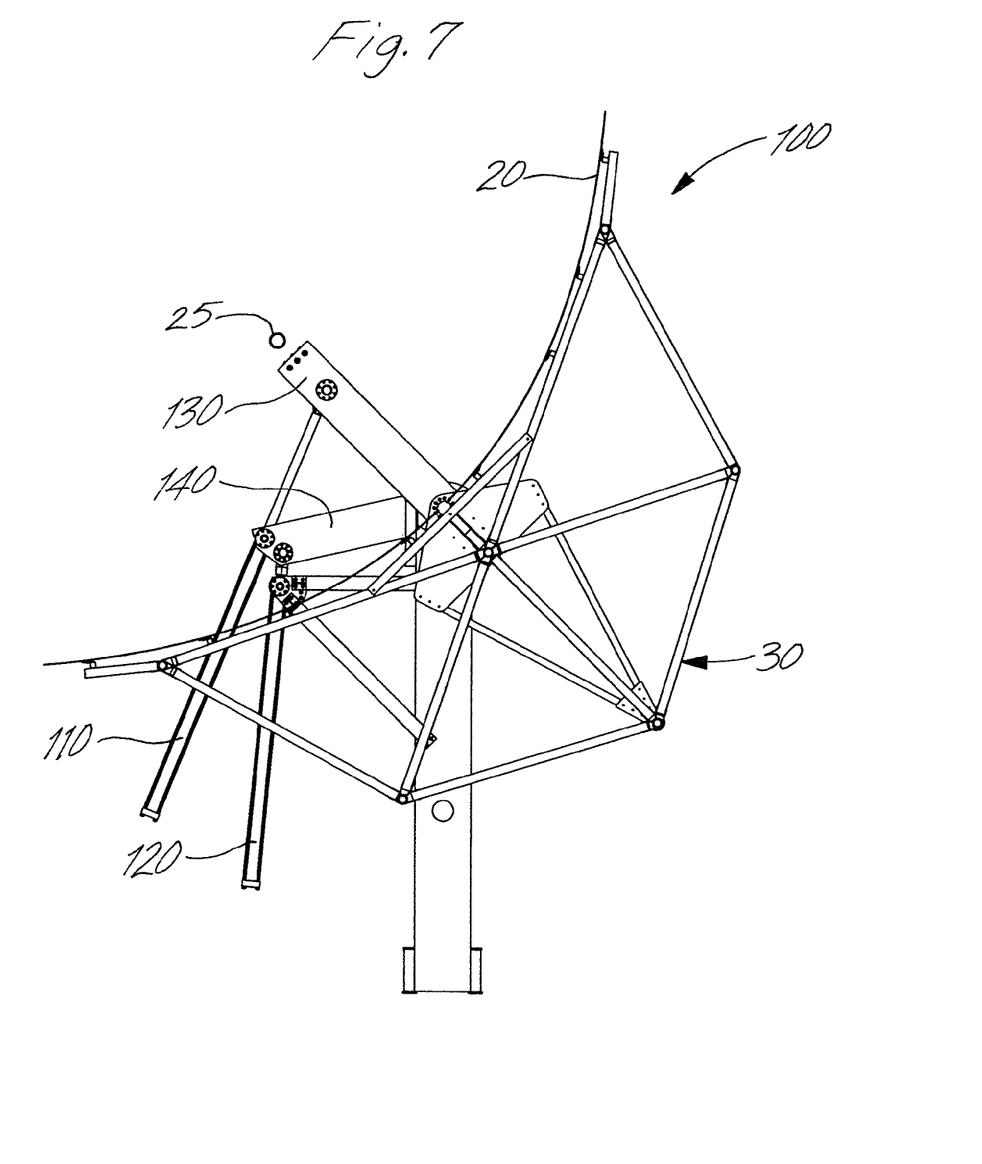
FIG. 7 is a side view of the drive mechanism for a solar concentrator assembly of FIG. 4, the solar concentrator assembly being shown in a second collecting position.

The drive mechanism 100 is moveable from the first position of FIGS. 4-6 to a second position (see FIG. 7) for maintaining the one or more troughs 20 of the SCA in a second solar energy collecting position. Of course, the drive mechanism 100 (and the troughs 20) may be maintained at any intermediate position between the first and second positions shown, the positions of FIGS. 4-12 being selected only as examples from among the many possible positions in which the drive mechanism 100 may hold the troughs 20. FIG. 7 shows the trough 20 held at an orientation wherein a midplane of the trough 20 is facing upward at an angle of approximately 45 degrees from the horizon. With further reference to FIG. 7, in the second position, the first ram 110 of the drive mechanism 100 has been operated to push the drive arms 130 in an upward direction, and the first ram 110 itself has rotated slightly about the pivot 144 at the first ends of the pivot arms 140. The pivot arms 140, however, according to one embodiment, remain stationary until the second ram 120 begins to push upward on the first ends of the pivot arms 140.

In the embodiment shown, the drive mechanism 100 is configured so that the first ram 110 is completely extended to apply force to the drive arms 130 before the second ram 120 begins to apply an upward force to the pivot arms 140. While this sequence of operating the first and second rams 110, 120 has advantages, the present invention is not limited thereto. That is, in alternative embodiments, the second ram 120 may apply a force to the pivot arms 140 before the first ram 110 is completely extended to apply force to the drive arms 130. Further, the second ram 120 may begin pushing on the pivot arms 140 before the first cylinder 110 has begun applying a force to the drive arms 130. As mentioned, the embodiment having the operating sequence as described and shown herein has advantages. One advantage is that the first ram 110 rotates about the pivot 144 of the pivot arms 140 but does not itself begin to move in an upward direction until it has been fully extended and the second ram 120 has begun to push upward on the pivot arm 140. As such, despite the first ram 110 being in an outer location relative to the solar collecting surfaces of the trough 20, as the trough 20 is rotated, the first ram 110 does not move upward with the trough 20 until the second ram 120 begins pushing on the pivot arm 140, thereby keeping a large portion of the first cylinder 110 below the trough 20 where it does not obstruct solar radiant energy from being collected by the trough 20.

Figure 8:
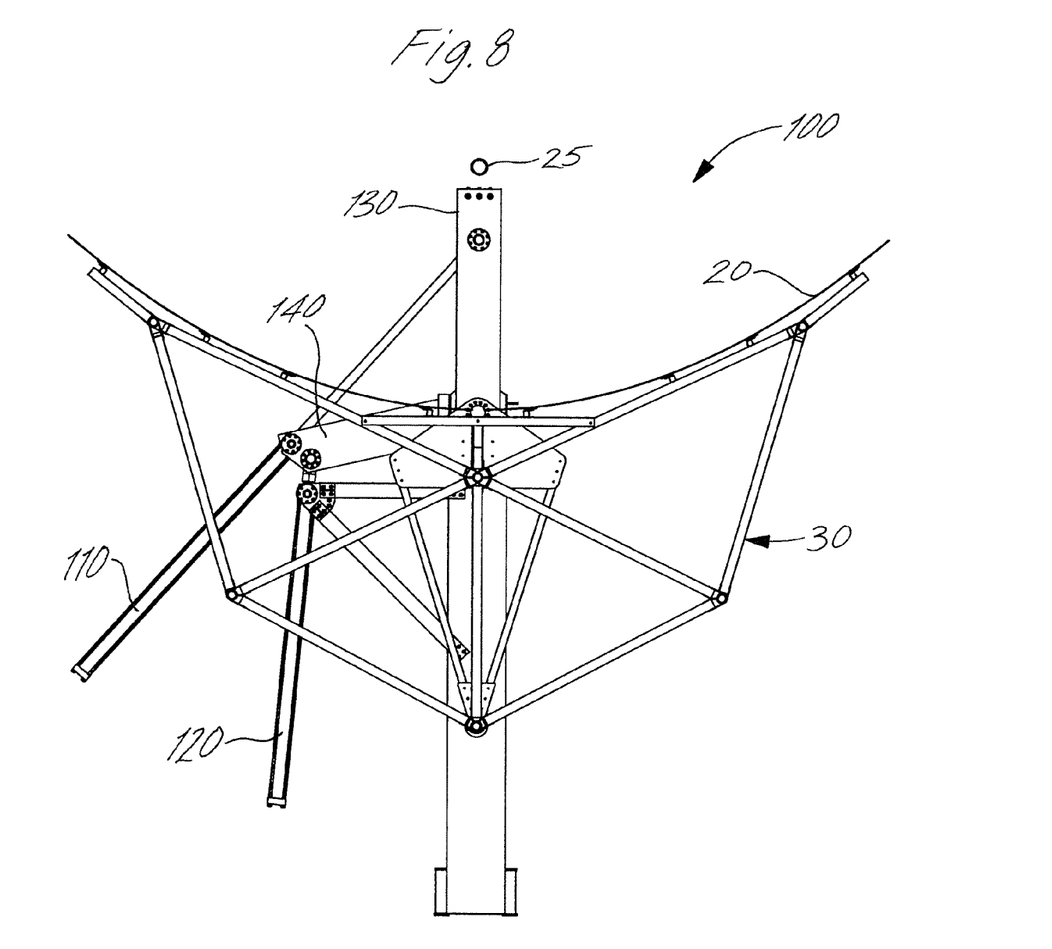
FIG. 8 is a side view of the drive mechanism for a solar concentrator assembly of FIG. 4, the solar concentrator assembly being shown in a third collecting position.

With reference to FIG. 8, the drive mechanism 100 is shown in a third position for providing the one or more troughs 20 of the SCA in a third solar energy collecting position. In the third exemplary position shown, the trough 20 is held at a full upward facing orientation. That is, a midplane of the trough 20 is substantially perpendicular to the horizontal. With further reference to FIG. 8, in the third position, the first ram 110 of the drive mechanism 100 has pushed the drive arms 130 further upward than shown and described previously in the second position, so that the length of the drive arms 130 from their first ends to their second ends is substantially perpendicular to the horizon. Further, the first ram 110 has rotated further about the pivot 144 of the pivot arms 140.

With reference to FIG. 9, the drive mechanism 100 is shown in a fourth exemplary position for providing the one or more troughs 20 of the SCA in a fourth solar energy collecting position. In this fourth position, the trough 20 has been rotated beyond the full upward facing orientation and is now facing upward at an angle of approximately 45 degrees from the opposite horizon. With further reference to FIG. 9, in the fourth position, the first ram 110 of the drive mechanism 100 has pushed the first ends of the drive arms 130 in a direction toward the opposite horizon. Further, the first ram 110 itself has rotated further about the pivot 144 of the pivot arms 140, and now a portion of the connecting rod of the first ram 110 is above the pylon shaft 50 and axis of rotation. In one embodiment, the first ram 110 may reach its fully extended state at about the fourth position, after which the first ram 110 remains in this fully extended state, and in order to further rotate the troughs 20, the second ram 120 begins to extend and to push against the first ends of the pivot arms 140. The operating lengths and mounting locations of the first and second rams 110, 120 are selected so that as the first ram 110 reaches its fully extended state and itself is rotated further over the pylon shaft 50, the connecting rod of the first cylinder 110 stops short of abutting against the pylon shaft 50.

With reference to FIG. 10, the drive mechanism 100 is shown in a fifth position for providing the one or more troughs 20 of the SCA in a fifth solar energy collecting position. In this fifth position, the trough 20 has been rotated further to an orientation in which it faces the opposite horizon. That is, in the fifth collecting position the trough 20 faces approximately 180 degrees away from the direction it faces in the first collecting position of FIGS. 4-6. With further reference to FIG. 10 showing the fifth position, between the fourth and fifth positions, the second ram 120 of the drive mechanism 100 pushes upward on the first ends of the pivot arms 140 to rotate the pivot arms 140, and the trough 20 coupled via the drive arms 130, further about the axis of rotation.

With reference to FIG. 11, the drive mechanism 100 is shown in a position for providing the trough 20 with a downward facing orientation, or a stowed position, such as for safety during high wind conditions. In this stowed position, the trough 20 has been rotated further to an orientation in which it faces downward at an angle of approximately 30 degrees from the opposite horizon. To provide the troughs 20 with this stowed position, the second ram 120 of the drive mechanism 100 pushes the first ends of the pivot arms 140 further in an upward direction to rotate the pivot arms 140, and the trough 20 coupled via the drive arms 130, further about the axis of rotation.

With reference to FIG. 12, the drive mechanism 100 is shown in a position for providing the troughs 20 with another downward facing orientation, in which the troughs 20 may be held, for example, for performing repairs or maintenance. In this maintenance position, the trough 20 has been rotated still further to an orientation in which a midplane of the trough 20 faces downward at an angle of approximately 60 degrees from the opposite horizon. To provide the troughs 20 with this maintenance position, the second ram 120 of the drive mechanism 100 pushes the first ends of the pivot arms 140 still further in an upward direction to rotate the pivot arms 140, and the trough 20 coupled via the drive arms 130, further about the axis of rotation. The first ram 110 remains in a fully extended position and continues to be rotated about the axis of rotation due to the force of the second ram 120.

It will be apparent to one skilled in the art that the trough 20 can be moved by the drive mechanism 100 from its maintenance position (FIG. 12) back to its first position (FIGS. 4-6) by operating the first and second rams 110, 120 in a reverse (pull) mode and in a reverse sequence. That is possible because the first and second rams 110, 120 are of the double-acting kind. Also, because the first and second rams 110, 120 of use are of the double-acting kind, it is possible to lock the drive mechanism 100 in any of its operational states (and so lock the troughs in any of their possible positions about their axis of rotation) by closing all fluid flow connections to and from the first and second rams 110, 120. It may be desirable, however, to provide one or more mechanical locks in cooperation with one or more of the SCA's stub axles to secure the SCA in a desired position (e.g., its stowed position), particularly for extended times.

The use of plural series-connected rams (or other linear drive mechanisms) in an SCA drive mechanism according to embodiments of this invention conveniently enables linear drives to be used to "turn the corner" around the mounting shaft axis of the SCA by use of simple and effective structural arrangements. Additionally, the use of pairs of drive arms and pivot arms, between which the rams are centered, avoids the creation of eccentric loads in the drive mechanism.

Further, in addition to the above description of embodiments of a drive mechanism for an SCA configured to rotate trough assemblies of the SCA throughout a day to track the position of the sun during the day, a drive mechanism for an SCA according to the present invention may also be configured and utilized to rotate an SCA throughout the year to track a position of the sun throughout the seasons. That is, a drive mechanism for an SCA according to the present invention may function as an elevation drive or as an azimuth drive, or both when two mechanisms are provided as a dual acting drive. Alternatively, embodiments of a drive mechanism according to the present invention may be configured, as either a single drive or a dual acting drive, for use in applications other than solar trough collectors. For example, a drive mechanism according to an embodiment of the present invention may be configured to rotate a satellite dish, concentrated photovoltaic cells, or any other device requiring variable focusing or alignment in elevation and azimuth. Additionally, a drive mechanism according to another embodiment of the present invention may include a third double-acting, fluid-powered (e.g., hydraulic or pneumatic) ram or cylinder, operable in series with the first and second double-acting rams, such that the drive mechanism may provide a full range of motion of at least 360 degrees.

Although the drawings and accompanying description illustrate certain embodiments of a drive mechanism for a solar concentrator assembly, it will be apparent that the novel aspects of the drive mechanism of the present invention may also be carried out by utilizing alternative structures, sizes, shapes, and/or materials. For example, although the drive mechanism is shown in the drawings as being connected to the troughs on a same side in which a heat collection tube is arranged, the drive mechanism may alternatively be connected to the troughs on an opposite side from the heat collection tube, such as to vary an amount of shadow cast on the trough by the drive mechanism. Moreover, embodiments of the drive mechanism of the present invention may alternatively be applied to other applications and/or market sectors, such as in any devices requiring rotary motion.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A drive mechanism for a linear solar concentrator assembly which includes an elongate reflector support frame which is rotatable about an axis which is parallel to the length of the frame and is defined by a support for the frame, the drive mechanism comprising:
    a first elongate arm fixable at one end to the frame for rotation about the axis with the frame;
    a second elongate arm rotatable at one end about the axis independently of the first arm;
    a first reversible linear drive device, coupled between the second arm and the first anti which is operable to rotate the first arm about the axis relative to the second arm; and
    a second reversible linear drive device coupled between the support and the second arm which is operable to rotate the second arm about the axis;
    wherein the first and second reversible linear drive devices are located substantially in a common plane normal to the axis.

2. The drive mechanism of claim 1, wherein the first and second reversible linear drive devices are hydraulically powered.

3. The drive mechanism of claim 1, wherein the first and second linear drive devices comprise electrically powered linear motion devices.

4. The drive mechanism of claim 1, wherein the first and second linear drive devices are arranged such that both the first and second linear drive devices are operable in an extend mode when the frame is rotated in a first direction about the axis and both the first and second linear drive devices are operable in a retract mode when the frame is rotated in a second direction about the axis opposite the first direction.

5. The drive mechanism of claim 1, wherein the drive mechanism is substantially symmetrical about a plane normal to the axis.

6. The drive mechanism of claim 1, wherein the drive mechanism is operable to rotate the frame about the axis through an angular range of at least 240 degrees.

7. A drive mechanism for a linear solar concentrator assembly which includes an elongate reflector support frame which is rotatable about an axis which is parallel to the length of the frame and is defined by a support for the frame, the drive mechanism comprising:
a first elongate arm fixable at one end to the frame for rotation about the axis with the frame;
a second elongate arm rotatable at one end about the axis independently of the first arm,
a first reversible linear drive device coupled between the second arm and the first arm which is operable to rotate the first arm about the axis relative to the second arm; and
a second reversible linear drive device coupled between the support and the second arm which is operable to rotate the second arm about the axis;
wherein the first and second rams are positioned to apply forces in substantially the same plane normal to the axis.

8. The drive mechanism of claim 7, wherein the first and second reversible linear drive devices are hydraulically powered.

9. The drive mechanism of claim 7, wherein the first and second linear drive devices comprise electrically powered linear motion devices.

10. The drive mechanism of claim 7, wherein the first and second linear drive devices are arranged such that both the first and second linear drive devices are operable in an extend mode when the frame is rotated in a first direction about the axis and both the first and second linear drive devices are operable in a retract mode when the frame is rotated in a second direction about the axis opposite the first direction.

11. The drive mechanism of claim 7, wherein the drive mechanism is substantially symmetrical about a plane normal to the axis.

12. The drive mechanism of claim 7, wherein the drive mechanism is operable to rotate the frame about the axis through an angular range of at least 240 degrees.

13. A drive mechanism for a linear solar concentrator assembly which includes an elongate reflector support frame which is rotatable about an axis which is parallel to the length of the frame and is defined by a support for the frame, the drive mechanism comprising:
a pair of spaced apart first elongate arms fixable at one end to the frame for rotation about the axis with the frame;
a second elongate arm rotatable at one end about the axis independently of the first arm, the second elongate arm being at least partly rotatable between the first elongate arms;
a first reversible linear drive device coupled between the second arm and the first arms which is operable to rotate the first arms about the axis relative to the second arm; and
a second reversible linear drive device coupled between the support and the second arm which is operable to rotate the second arm about the axis.

14. The drive mechanism of claim 13, wherein the first and second reversible linear drive devices are located substantially in a common plane normal to the axis.

15. The drive mechanism of claim 13, wherein the first and second reversible linear drive devices are hydraulically powered.

16. The drive mechanism of claim 13, wherein the first and second linear drive devices comprise electrically powered linear motion devices.

17. The drive mechanism of claim 13, wherein the first and second linear drive devices are arranged such that both the first and second linear drive devices are operable in an extend mode when the frame is rotated in a first direction about the axis and both the first and second linear drive devices are operable in a retract mode when the frame is rotated in a second direction about the axis opposite the first direction.

18. The drive mechanism of claim 13, wherein the dive mechanism is substantially symmetrical about a plane normal to the axis.

19. The drive mechanism of claim 13, wherein the drive mechanism is operable to rotate the frame about the axis through an angular range of at least 240 degrees.

* * * * *